(12) United States Patent
Riccoti et al.

(10) Patent No.: US 7,578,196 B2
(45) Date of Patent: Aug. 25, 2009

(54) INTEGRATED PRESSURE SENSOR WITH DOUBLE MEASURING SCALE AND A HIGH FULL-SCALE VALUE

(75) Inventors: Giulio Riccoti, Broni (IT); Marco Morelli, Bareggio (IT); Luigi Della Torre, Lissone (IT); Andrea Lorenzo Vitali, Bergamo (IT); Ubaldo Mastromatteo, Bareggio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 31 days.

(21) Appl. No.: 12/018,068

(22) Filed: Jan. 22, 2008

(65) Prior Publication Data

US 2008/0208425 A1    Aug. 28, 2008

Related U.S. Application Data

(63) Continuation-in-part of application No. PCT/IT2005/000431, filed on Jul. 22, 2005.

(51) Int. Cl.
*G01L 9/00* (2006.01)

(52) U.S. Cl. .......................................... 73/754; 73/727

(58) Field of Classification Search ................... 73/754, 73/727; 438/53
See application file for complete search history.

(56) References Cited

U.S. PATENT DOCUMENTS

| | | | |
|---|---|---|---|
| 4,766,666 A * | 8/1988 | Sugiyama et al. .......... 29/621.1 |
| 4,945,769 A * | 8/1990 | Sidner et al. ................... 73/727 |
| 4,972,716 A | 11/1990 | Tobita et al. | |
| 5,259,248 A | 11/1993 | Ugai et al. | |
| 5,291,788 A * | 3/1994 | Oohata et al. .................. 73/727 |
| 6,240,785 B1 * | 6/2001 | Chapman et al. .............. 73/727 |
| 6,912,759 B2 * | 7/2005 | Izadnegahdar et al. ...... 29/25.35 |
| 7,418,871 B2 * | 9/2008 | Moelkner et al. ............. 73/754 |
| 2005/0160827 A1 * | 7/2005 | Zdeblick et al. .............. 73/715 |
| 2005/0208696 A1 | 9/2005 | Villa et al. | |
| 2008/0223143 A1 * | 9/2008 | Murari et al. .................. 73/727 |

* cited by examiner

*Primary Examiner*—Andre J Allen
(74) *Attorney, Agent, or Firm*—Lisa K. Jorgenson; Robert Iannucci; Seed IP Law Group PLLC (57) ABSTRACT

In a pressure sensor with double measuring scale: a monolithic body of semiconductor material has a first main surface, a bulk region and a sensitive portion upon which pressure acts; a cavity is formed in the monolithic body and is separated from the first main surface by a membrane, which is flexible and deformable as a function of the pressure, and is arranged inside the sensitive portion and is surrounded by the bulk region; a low-pressure detecting element of the piezoresistive type, sensitive to first values of pressure, is integrated in the membrane and has a variable resistance as a function of the deformation of the membrane; in addition, a high-pressure detecting element, also of a piezoresistive type, is formed in the bulk region inside the sensitive portion and has a variable resistance as a function of the pressure. The high-pressure detecting element is sensitive to second values of pressure.

32 Claims, 3 Drawing Sheets

INTEGRATED PRESSURE SENSOR WITH DOUBLE MEASURING SCALE AND A HIGH FULL-SCALE VALUE

CROSS-REFERENCE TO RELATED APPLICATION

This application is a continuation-in-part of International Patent Application No. PCT/IT2005/000431, filed Jul. 22, 2005, now pending, which application is incorporated herein by reference in its entirety.

BACKGROUND

1. Technical Field

This invention relates to an integrated pressure sensor with double measuring scale and a high full-scale value. In particular, the following description makes specific reference, without this implying any loss of generality, to the use of this pressure sensor in a BBW (Brake-By-Wire) electromechanical braking system.

2. Description of the Related Art

As is known, traditional disc braking systems for vehicles include a disc that is fixed to a respective wheel of the vehicle, a caliper associated with the disc and a hydraulic control circuit. Pads (normally two in number) of a friction material and one or more pistons connected to the hydraulic control circuit are housed inside the caliper. Following the operation of the brake pedal by a user, a pump in the hydraulic control circuit pressurizes a fluid contained within the circuit itself. Accordingly, the pistons, equipped with sealing elements, leave their respective seats and press the pads against the surface of the disc, thereby exerting a braking action on the wheel.

Recently, so-called "Drive-by-Wire" systems have been proposed, which provide for the electronic control of a vehicle's main functions, such as the steering system, the clutch and the braking system, for example. In particular, electronically controlled braking systems have been proposed that envisage the substitution of hydraulic calipers with electromechanical actuators. In detail, suitable sensors detect the operation of the brake pedal and generate corresponding electrical signals that are then received and interpreted by an electronic control unit. The electronic control unit then controls the operation of the electromechanical actuators (for example, pistons driven by an electric motor), which exert the braking action on the relative brake discs via the pads. The electronic control unit also receives information from the sensors associated with the braking system regarding the braking action exerted by the electromechanical actuators, in order to accomplish a closed-loop feedback control (for example, via a proportional-integral-derivative controller—PID). In particular, the electronic control unit receives information on the pressure exerted by each actuator on the respective brake disc.

Pressure sensors with a high full-scale value are needed for measuring this pressure. In fact, the force with which the pads are pressed against the disc can have values from 0 up to a maximum in the range 15000-35000 N. The piston acting on the pads has a section of approximately 2 cm$^2$ and hence the pressure sensors must be capable of working up to full-scale values of around 1700 Kg/cm$^2$ or higher (2000 Kg/cm$^2$, for example). Furthermore, the need is felt to perform a pressure measurement with a double measuring scale, i.e., to measure both low pressures with a first precision and high pressures with a second precision, lesser than the first precision.

At present, sensors are known which are capable of measuring high pressure values, these being made with a steel core on which strain gauge elements are fixed. Under the effect of pressure, the steel core deforms according to Hook's Law:

$$\Delta L = E \cdot \sigma$$

where $\Delta L$ indicates the geometric variation of a linear dimension of the core, $E$ is Young's Module of the material constituting the core and $\sigma$ is the pressure acting on the core in a direction parallel to the deformation dimension. The strain gauge elements detect the geometric deformation of the core to which they are associated via changes in electrical resistance. However, for reasons of reliability, dimensions and costs, these sensors are only applicable to and utilizable for the purposes of characterization and development of a braking system of the previously described type, not the production phase. In addition, they do not have high precision and are equipped with a single measuring scale.

Integrated pressure sensors, made using semiconductor technology, are also known. These sensors typically include a thin membrane suspended above a cavity formed in a silicon body. Piezoresistive elements connected to each other to form a Wheatstone bridge are diffused inside the membrane. When subjected to pressure, the membrane deforms, causing a change in resistance of the piezoresistive elements, and therefore an unbalancing of the Wheatstone bridge. However, these sensors cannot be used for the measurement of high pressures, as they have low full-scale values (in particular, of around 10 Kg/cm$^2$), significantly lower than the pressure values that are generated in the previously described braking systems.

BRIEF SUMMARY

One embodiment provides a pressure sensor allowing the above-mentioned drawbacks and problems to be overcome and, in particular, having a double measuring scale and a high full-scale value, in order to measure both high-pressures and low-pressure values.

According to one embodiment, a pressure sensor with a double measuring scale, as defined in claim 1, is therefore provided.

BRIEF DESCRIPTION OF THE SEVERAL VIEWS OF THE DRAWINGS

For a better understanding of the invention, preferred embodiments thereof will now be described, purely by way of non-limitative example and with reference to the attached drawings, wherein.

DETAILED DESCRIPTION

Figure 1:
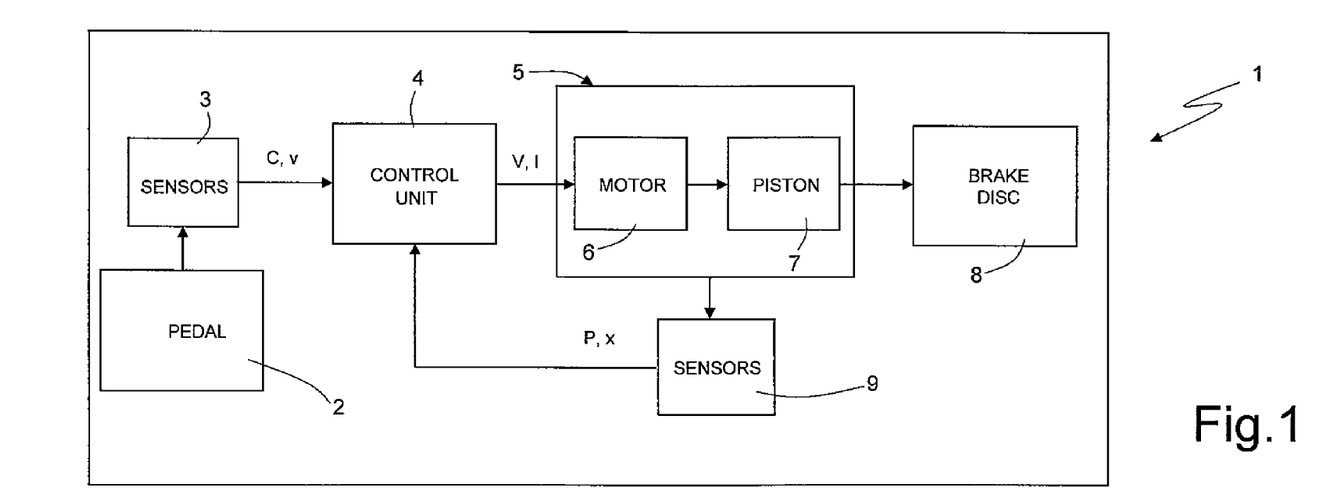
FIG. 1 illustrates a block diagram of an electromechanical Brake-By-Wire braking system.

FIG. 1 shows a block diagram of a braking system 1 of the electromechanical type (so-called "Brake-By-Wire"), comprising: a brake pedal 2, first sensors 3 suitable for detecting the travel C and actuation speed v of the brake pedal 2, an electronic control unit 4 connected to the first sensors 3, an electromechanical actuator 5 connected to the electronic control unit 4 and consisting of an electric motor 6 and a piston 7 connected to the electric motor 6 by a worm screw type connection element (not shown), a brake disc 8 connected to the electromechanical actuator 5 and fixed to a wheel of the vehicle (in a per se known manner which is not shown), and second sensors 9 suitable for collecting information regarding the braking action exerted by the electromechanical actuator 5 on the brake disc 8 and connected in feedback to the electronic control unit 4.

In use, the first sensors 3 send data regarding the travel C and actuation speed v of the brake pedal 2 to the electronic control unit 4 that, based on this data, generates a control signal (a voltage V, or current I signal) for the electromechanical actuator 5 (in particular, for the electric motor 6). According to this control signal, the electric motor 6 generates a drive torque that is transformed into a linear movement of the piston 7 by the worm screw type connection element. Accordingly, the piston 7 presses on the brake disc 8 (via pads of abrasive material, not shown), so as to slow down its rotation. The second sensors 9 detect the value of the pressure P exerted by the piston 7 on the brake disc 8 and the position x of the piston 7 with respect to the brake disc 8, and send this data in feedback to the electronic control unit 4. In this way, the electronic control unit 4 performs a closed-loop control (a PID control, for example) on the braking action.

According to one embodiment, the second sensors 9 comprise an integrated pressure sensor 15 (FIG. 2), made using semiconductor technology and configured to measure the pressure P exerted by the piston 7 on the brake disc 8. As it is not shown, the pressure sensor 15 is housed in a casing of the electromechanical actuator 5 and is configured to be sensitive to the pressure P exerted by the piston 7.

Figure 2:
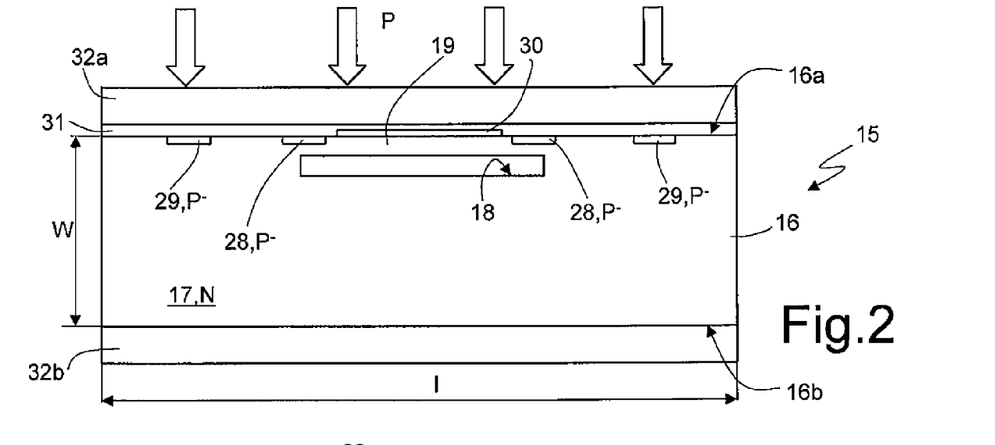
FIG. 2 shows a cross-section of a pressure sensor made according to a first embodiment of this invention.

In detail, as shown in FIG. 2 (which is not in scale, as are the subsequent figures), the pressure sensor 15 comprises a monolithic body 16 of semiconductor material, preferably N-type monocrystal silicon with orientation (100) of the crystallographic plane. The monolithic body 16 has a square section, with sides l equal to 15 mm for example, a first main external surface 16a, whereon the pressure P to be measured acts, and a second main external surface 16b, opposite and parallel to the first main external surface 16a, and separated from the first main external surface 16a by a substantially uniform distance w, equal to 375 µm for example.

The monolithic body 16 comprises a bulk region 17 and a cavity 18, buried within the monolithic body 16. The cavity 18 has a square section, for example with sides equal 300 µm, and a thickness of approximately 1 µm (in particular, the dimensions of the cavity 18 are quite small as compared to the dimensions of the monolithic body 16). The cavity 18 is separated from the first main external surface 16a by a membrane 19, which has a thickness equal to 0.5 µm for example, and is surrounded by the bulk region 17. The membrane 19 is flexible and able to deflect with external stresses; in particular, as described in detail in the following, the membrane 19 deforms as a function of the pressure P acting on the monolithic body 16. Furthermore, the thickness of the membrane 19 is less than the depth of the cavity 18, in order to avoid shear stress in correspondence to the points of restraint of the membrane 19, which could cause breakage.

For example, the cavity 18 could be formed according to the manufacturing process described in U.S. patent application Ser. No. 11/082,491, filed on Mar. 16, 2005, and assigned to STMicroelectronics Srl.

Figure 3:
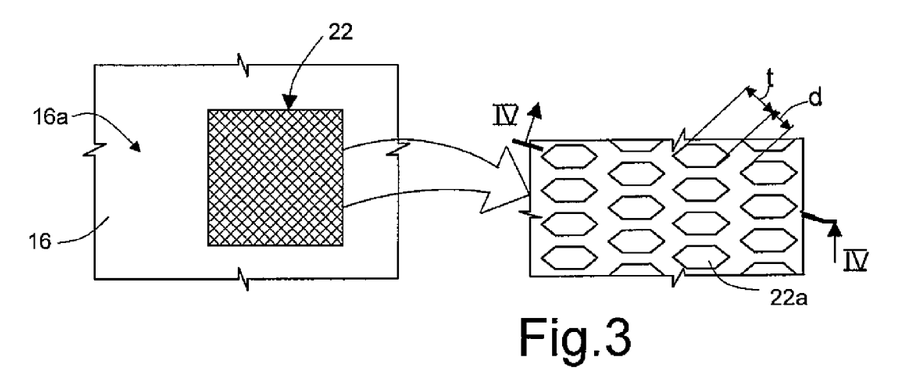
FIGS. 3 and 4 show initial steps of a manufacturing process for the pressure sensor in FIG. 2.

In short, FIG. 3, this process initially envisages for a resist layer to be deposited on the first main external surface 16a, which is then delineated to form a mask 22. The mask 22 has an approximately square-shaped area and comprises a number of hexagonal mask portions 22a defining a honeycomb grid (as shown in the enlarged detail of FIG. 3). For example, the distance t between opposite sides of the mask portions 22a is equal to 2 µm, while the distance d between facing sides of adjacent mask portions 22a is equal to 1 µm.

Figure 4:
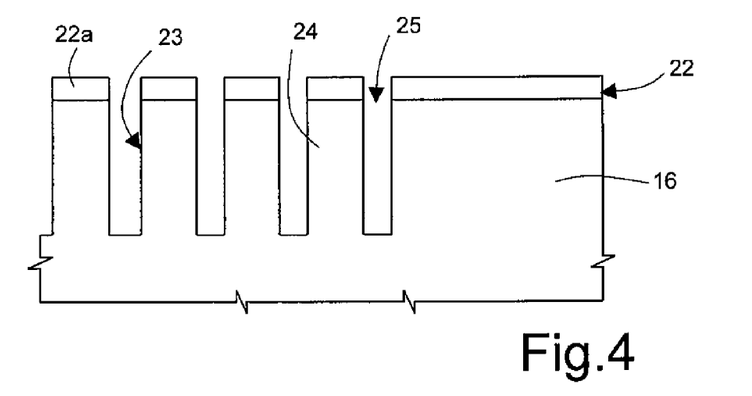

Then, FIG. 4, anisotropic etching of the monolithic body 16 is performed using the mask 22, according to which trenches 23 are formed, which have a depth of 10 µm for example, are intercommunicating and delimit a number of silicon columns 24. In practice, the trenches 23 form an open region 25 with a complex shape wherein the columns 24 extend.

Afterwards, the mask 22 is removed and an epitaxial growth is performed in a deoxidizing environment. As a consequence, an epitaxial layer grows on top of the columns 24 and closes the open region 25 at the top. A step of thermal annealing is then performed that causes migration of the silicon atoms, which tend to move into the position of lower energy. Accordingly, and also thanks to the close distance between the columns 24, the silicon atoms migrate completely from the portions of the columns 24 inside the open region 25, thereby forming the cavity 18 (FIG. 2), buried within the monolithic body 16. A thin layer of silicon remains on top of the cavity 18, formed in part by epitaxially grown silicon atoms and in part by migrated silicon atoms, which forms the membrane 19.

First piezoresistive detecting elements 28, constituted by P⁻-type doped regions, are provided within the membrane 19. The first piezoresistive detecting elements 28 are formed via the diffusion of dopant atoms through an appropriate diffusion mask and have, for example, an approximately rectangular section; furthermore, they are connected in a Wheatstone-bridge circuit. As described in the following, the resistance of the first piezoresistive detecting elements 28 varies as a function of the deformation of the membrane 19.

In a surface portion of the bulk region 17, in a separate and distinct position with respect to the membrane 19, second piezoresistive detecting elements 29 are provided, these also constituted by P⁻-type doped regions formed via diffusion. The second piezoresistive detecting elements 29 are separated from the membrane 19 by a distance of not less than 50 µm, in order not to suffer from stresses acting on the membrane 19. In particular, the second piezoresistive detecting elements 29 are integrated within a solid and compact portion of the bulk region 17, having a thickness substantially equal to the distance w.

A focusing region 30, of silicon monoxide, is arranged on top of the first main external surface 16a of the monolithic body 16 next to the membrane 19, in order to focus the pressure P on the membrane 19, forcing it to become deformed. In addition, a passivation layer 31 (also of silicon monoxide for example) covers the first main external surface 16a and the focusing region 30, and a first and a second cushion layer 32a and 32b, made of an elastic material, polyamide for example, are arranged on top of the passivation layer 31, and below the second main external surface 16b of the monolithic body 16.

The operation of the pressure sensor 15 is based on the so-called piezoresistive effect, according to which a stress applied to a piezoresistive element causes a change in resistance. In case of semiconductor materials, such as silicon, the applied stress, as well as causing a change in the dimensions of the piezoresistive element, causes a deformation of the crystal lattice and thus an alteration in the mobility of the majority charge carriers, and a change in resistance. For example, in silicon, a 1% deformation of the crystal lattice corresponds to a change of approximately 30% in the mobility of the majority charge carriers. In particular, the change in resistance is caused by stress acting in both the parallel direction (so-called longitudinal stress) and in the normal direction (so-called transversal stress) to the plane in which the piezoresistive elements lie. As a rule, the change in resistance of a piezoresistive element can be expressed by the following relation:

$$\frac{\Delta R}{R} = \frac{\Pi_{44}}{2}(\sigma_l - \sigma_t)$$

where R is the resistance of the piezoresistive element, $\Delta R$ is the change of this resistance, $\pi_{44}$ is the piezoresistive coefficient of the semiconductor material, equal to $138.1 \cdot 10^{-11}$ $Pa^{-1}$ for P-type monocrystal silicon for example, and $\sigma_l$ and $\sigma_t$ are respectively the longitudinal and transversal stress acting on the piezoresistive element.

With reference to the pressure sensor 15 in FIG. 2, the monolithic body 16 is arranged in a manner such that the pressure P to be measured causes stress in a direction which is normal to the first main external surface 16a.

In particular, the pressure P causes a deformation of the membrane 19, which is forced to deform by the focusing region 30. This deformation induces longitudinal and transversal mechanical stresses on the first piezoresistive detecting elements 28, which consequently change the resistance value. The first piezoresistive detecting elements 28 are generally arranged so that a compression stress occurs in a part of them and a stretching stress in the remainder, so as to increase the sensitivity of the Wheatstone-bridge circuit. The change in resistance of the first piezoresistive detecting elements 28 thus causes unbalancing of the Wheatstone-bridge circuit, which is detected by a suitable reading circuit.

In addition, the pressure P essentially causes a transversal compression stress $\sigma_t$ (of a negative value) on each of the second piezoresistive detecting elements 29, while the longitudinal stress $\sigma_l$ acting on the second piezoresistive detecting elements 29 is substantially null (in the hypothesis that flexure or curving phenomena do not occur in the monolithic body 16). In particular, the first cushion layer 32a uniformly distributes the compression stress on the first main external surface 16a of the monolithic body 16, avoiding local concentrations that could cause cracks along the axes of the crystal lattice. The change in resistance of the second piezoresistive detecting elements 29 is therefore expressed by the relation:

$$\frac{\Delta R}{R} = \frac{\Pi_{44}}{2} \cdot \sigma_t$$

from which it follows that the pressure P causes an increase in the resistance R of each of the second piezoresistive detecting elements 29, which can be measured by a suitable reading circuit.

In detail, one embodiment is based on the observation that for low values of pressure P, the deformation of the second piezoresistive detecting elements 29 proves to be practically negligible; conversely, the membrane 19 is forced to deform, causing a corresponding deformation of the first piezoresistive detecting elements 28, which is detected by the reading circuit to provide a measurement of the applied pressure P. As the pressure P increases, so does the deformation of the membrane 19, until the membrane 19 comes into contact with the bottom of the underlying cavity 18, saturating the pressure value supplied at output (as further deformation is not possible). In particular, this saturation occurs for values of pressure P of around 10-15 Kg/cm². At this point, a further increase in the pressure P starts to affect the entire first main external surface 16a, and to cause a significant change in the resistance of the second piezoresistive detecting elements 29, from which the value of the pressure P is derived.

Therefore, the pressure measurements provided by the first and the second piezoresistive detecting elements 28 and 29 are independent and complementary, occurring at different values of the pressure P. The pressure sensor 15 thus has a first measuring scale, valid for low values of pressure P and having a full-scale value of around 10-15 Kg/cm² (determined by the membrane 19 and the first piezoresistive detecting elements 28, which together thus form a low pressure sensitive element), and a second measuring scale, valid for high values of pressure P and having a full-scale value of around 2000 Kg/cm² (determined by the second piezoresistive detecting elements 29, which together thus form a high pressure sensitive element). The first measuring scale has a higher precision than the second one, given that the membrane 19 is sensitive to even minimal changes in pressure P.

The pressure sensor 15 has a considerable resistance to high pressures. In fact, as is known, monocrystal silicon exhibits high break resistance to compression stresses, having values that range from 11,200 Kg/cm² to 35,000 Kg/cm², according to the crystallographic orientation, for which it is fully capable of tolerating the maximum pressure values (of around 1700 Kg/cm²) occurring inside a braking system. In a similar manner, the passivation layer 31 and the cushion layers 32a and 32b are able to tolerate stresses of this order of magnitude. Furthermore, the deflections of the membrane 19 in the vertical direction are limited by the reduced depth of the cavity 18, in this way avoiding breakage of the membrane 19 at high pressure values.

Figure 5:
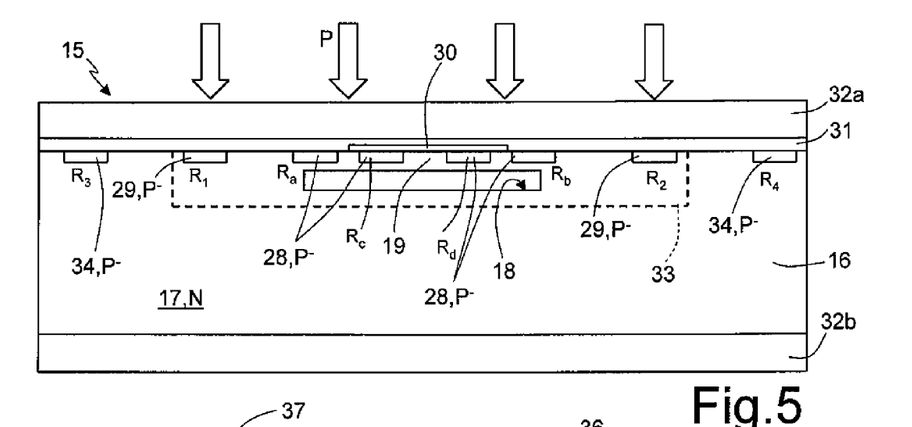
FIG. 5 shows a cross-section of a pressure sensor in a second embodiment of the present invention.

According to a one embodiment, FIG. 5, the pressure P is only directed on a portion of the monolithic body 16. In particular, the monolithic body 16 has a pressure-sensitive portion 33, arranged in a central position with respect to the body (schematically shown in FIG. 5 by the rectangle in dashed lines), upon which the pressure P to be measured is applied. The pressure acting outside of the pressure-sensitive portion 33, is instead substantially null.

The first and the second piezoresistive detecting elements 28 and 29 are formed inside the pressure-sensitive portion 33, while piezoresistive reference elements 34, in particular diffused P⁻-type resistors, are formed in a portion of the bulk region 17, distinct and separate from the pressure-sensitive portion 33. Accordingly, the piezoresistive reference elements 34 do not exhibit resistance changes as a function of the pressure P. Nevertheless, the piezoresistive reference elements 34 are sensitive to the same environmental parameters (temperature for example) to which the detecting elements are subjected.

In detail, FIG. 5 shows four first piezoresistive detecting elements 28, indicated by $R_a$-$R_d$, two second piezoresistive detecting elements 29, indicated by $R_1$ and $R_2$, and two piezoresistive reference elements 34, indicated by $R_3$ and $R_4$.

Two of the first piezoresistive detecting elements 28, $R_a$ and $R_b$, are arranged at opposite peripheral portions of the membrane 19 so as to mainly feel stretching stresses, while the remaining first piezoresistive detecting elements 28, $R_c$ and $R_d$, are arranged at internal portions of the membrane 19 so as to mainly feel compression stresses. The first piezoresistive detecting elements 28 are connected to form a first Wheatstone-bridge circuit 36 (FIG. 6), with resistors variable in the same direction arranged on opposite sides of the bridge, in order to increase the sensitivity of the circuit. The first Wheatstone-bridge circuit 36 is fed with a first supply voltage $V_{in1}$ and supplies a first output voltage $V_{out1}$.

Figure 6:
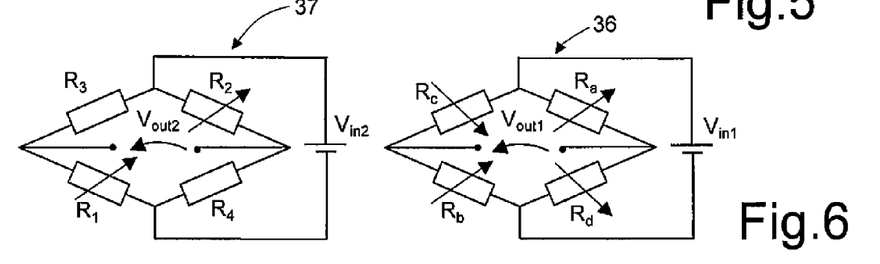
FIG. 6 is an equivalent circuit diagram of the pressure sensor in FIG. 5.

The piezoresistive reference elements 34 are, in turn, connected to the second piezoresistive detecting elements 29 to form a second Wheatstone-bridge circuit 37, wherein the pressure-variable resistances $R_1$ and $R_2$ are arranged on opposite sides of the bridge, in order to increase sensitivity thereof. The second Wheatstone-bridge circuit 37 is fed with a second supply voltage $V_{in2}$ and supplies a second output voltage $V_{out2}$. The particular internal arrangement of the second Wheatstone-bridge circuit 37 advantageously allows a differential measurement to be taken, according to which variations in resistance due to environmental parameters are cancelled, so that the second output voltage $V_{out2}$, and thus the measured value of the pressure P, are insensitive to these parameters.

In particular, the first and the second piezoresistive detecting elements 28 and 29 are not electrically connected together, and are part of two distinct and independent electronic reading circuits (so as to achieve, as previously pointed out, the two measurement scales of the pressure sensor 15). In particular, for low values of pressure P, the second output voltage $V_{out2}$ is essentially null, while the first output voltage $V_{out1}$ is used by a suitable electronic measurement circuit (of known type and including at least one instrumentation amplifier) for measuring the pressure P. Conversely, for high values of pressure P, the first output voltage $V_{out1}$ saturates, and the electronic measurement circuit measures the pressure P from the second output voltage $V_{out2}$.

Figure 7:
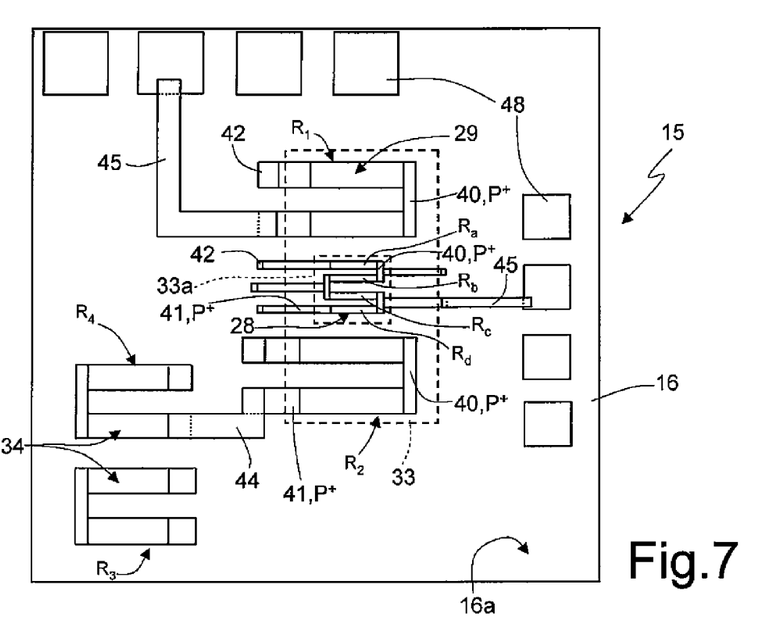
FIG. 7 shows a schematic top view of a pressure sensor made in accordance with the second embodiment.

A possible embodiment of the pressure sensor 15 is schematically illustrated in FIG. 7.

In detail, the first piezoresistive detecting elements 28 are formed in a central area 33a of the pressure-sensitive portion 33, and are connected to each other to form the first Wheatstone-bridge circuit 36 (FIG. 6). In addition, four second piezoresistive detecting elements 29 are formed inside the pressure-sensitive portion 33, and are connected two-by-two in series, so as to form a first and a second resistor (again indicated by $R_1$ and $R_2$). First interconnections 40, constituted by $P^+$-type diffused regions provide electrical connections inside the pressure-sensitive portion 33, while second interconnections 41, these also constituted by $P^+$-type diffused regions, provide connections to the outside of the pressure-sensitive portion 33, where electrical contacts 42 are provided for contacting the second interconnections 41.

Four piezoresistive reference elements 34 are formed outside of the pressure-sensitive portion 33 and are configured in a mirror-like fashion with respect to the second piezoresistive detecting elements 29, namely by also being connected two-by-two in series, so as to form a third and a fourth resistor (again indicated by $R_3$ and $R_4$). The terminals of the third and the fourth resistors $R_3$ and $R_4$ are connected via first metal lines 44, in aluminum for example, to the electrical contacts 42, in order to form the Wheatstone-bridge circuit 37 (FIG. 6) together with the first and second resistors $R_1$ and $R_2$. Second metal lines 45, also of aluminum, connect each of the electrical contacts 42 with respective pads 48 provided on the first main surface 16a of the monolithic body 16. In FIG. 7, for sake of clarity, only one of the first and the second metal lines 44 and 45 are shown, by way of example. A connection can be made between the pads 48 and the electronic measurement circuit integrating the reading electronics for the pressure sensor 15 via the wire-bonding technique in a per se known manner. This electronic circuit could possibly be positioned in a more protected environment with respect to that of the braking system, for example, inside a control unit connected to the pressure sensor 15 via a shielded cable.

The described pressure sensor has a number of advantages.

First, it has a high full-scale value and allows pressures to be measured with a double measuring scale, a more precise first scale for low-pressure measurements and a less precise scale for measuring high-pressure values. In particular, the described pressure sensor integrates the high and low pressures sensitive elements in a same monolithic body of semiconductor material, with reduced costs and manufacturing complexity with respect to traditional pressure sensors.

The pressure sensor performs a differential type of measurement between one or more detecting elements and one or more piezoresistive reference elements, and thus proves to be insensitive to variations in environmental parameters or manufacturing spread.

In addition, the $P^+$-type diffused interconnections between the piezoresistive detecting elements inside the pressure-sensitive area 33 are advantageous. In fact, given the high values of pressure P, it is impossible to use normal connection techniques (aluminum metallization for example). These techniques can instead be used outside the pressure-sensitive area 33, to create the connections between the detecting elements and the reference elements, and the connections to the pads.

Finally, it is clear that modifications and variations can be made to what described and illustrated herein without thereby departing from the scope of the present invention.

In particular, it is clear that the shape and dimensions of the monolithic body 16 can be different from that described and illustrated; in particular, the section of the monolithic body 16 could be rectangular or circular, instead of square. Even the cavity 18 could have a different shape from that shown, such as for example a generically polygonal section.

Furthermore, the number and arrangement of the first and second piezoresistive detecting elements 28 and 29, and the piezoresistive reference elements 34, could be different.

The detecting elements and the piezoresistive reference elements could be formed with ion implantation techniques instead of diffusion.

Figure 8:
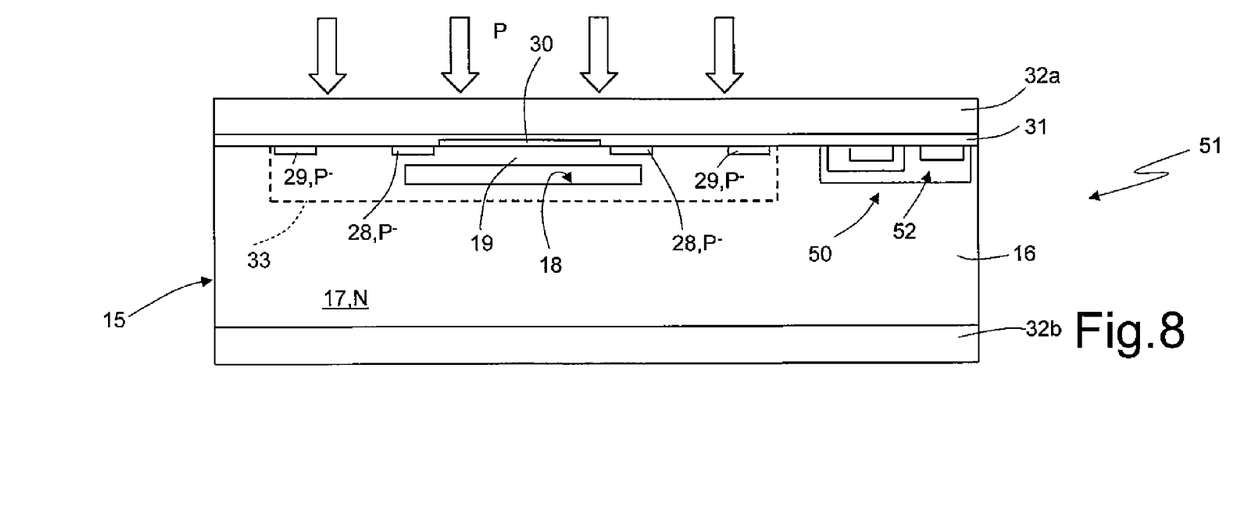
FIG. 8 shows a pressure-measuring device according to one aspect of the present invention.

An electronic measurement circuit 50 could be integrated inside the monolithic body 16 (see FIG. 8) in an area of the bulk region 17 separate from the pressure-sensitive portion 33, in order to form a pressure measurement device 51 integrated on a single die. In particular, in FIG. 8, the electronic measurement circuit 50, connected to the pressure sensor 15 (in a manner not shown), is schematized via a single bipolar transistor 52. In a manner not shown, electrical insulation regions could be provided for the electrical insulation of the electronic measurement circuit 50.

In addition, the low pressure sensitive element could be associated with a high pressure sensitive element of a different type with respect to what described, configured to be sensitive to the high values of the pressure P to be measured. In this case as well, the general idea continues to apply of using the low pressure sensitive element (membrane and associated piezoresistive elements) for the measurement of low values of pressure P and the high pressure sensitive element for the measurement of values of pressure P greater than a saturation threshold of the low pressure sensitive element (the two sensitive elements thus providing independent and complementary measurements).

The monolithic body 16 could possibly have a number of pressure sensitive areas, each of which comprising a high pressure sensitive element and a low pressure sensitive element, and measuring a different pressure.

Finally, it is clear that the pressure sensor 15 could also be used to advantage in other applications wherein it is necessary to measure high pressure values with a double measuring scale.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pressure sensor with double measuring scale, comprising:
   a monolithic body of semiconductor material having a first main surface, a bulk region and a sensitive portion structured to be acted on by pressure;
   a cavity, formed in said monolithic body and separated from said first main surface by a membrane, which is flexible and deformable as a function of said pressure, said membrane being arranged inside said sensitive portion and surrounded by said bulk region; and
   a piezoelectric first low-pressure detecting element sensitive to first values of said pressure, integrated in said membrane and having a variable resistance as a function of the deformation of said membrane; and
   a high pressure sensitive element, arranged externally to said membrane and sensitive to second values of said pressure, higher than said first values.

2. A pressure sensor according to claim 1, wherein said monolithic body also has a second main surface opposite to said first main surface and separated from said first main surface by a distance, and wherein said first high-pressure detecting element is formed in a first portion of said bulk region, which is solid and compact, and has a thickness substantially equal to said distance.

3. A pressure sensor according to claim 2, wherein said distance is substantially constant.

4. A sensor according to claim 1, wherein said cavity is contained and completely isolated within said monolithic body.

5. A sensor according to claim 1, wherein said first low-pressure detecting element and said high pressure sensitive element are not electrically connected together.

6. A pressure sensor according to claim 1, wherein said high pressure sensitive element comprises a piezoresistive first high-pressure detecting element formed in said bulk region inside said sensitive portion and having a variable resistance as a function of said pressure.

7. A pressure sensor according to claim 6, wherein said bulk region exhibits a first type of conductivity, and wherein said first low-pressure detecting element and said first high-pressure detecting element comprise a respective doped region having a second type of conductivity, opposite to said first type of conductivity, and formed by introduction of dopants within said monolithic body.

8. A pressure sensor according to claim 6, also comprising further piezoresistive low-pressure detecting elements integrated within said membrane, and wherein said high pressure sensitive element also comprises further piezoresistive high-pressure detecting elements integrated within said bulk region and inside said sensitive portion, said first low-pressure detecting element and said further low-pressure detecting elements being connected in a first bridge circuit, and said first high-pressure detecting element and said further high-pressure detecting elements being connected in a second bridge circuit, distinct from said first bridge circuit.

9. A pressure sensor according to claim 8, wherein said bulk region exhibits a first type of conductivity, and wherein said first low-pressure detecting element and said further low-pressure detecting elements, and said first high-pressure detecting element and said further high-pressure detecting elements are connected to each other by respective interconnections, said interconnections including doped regions having a second type of conductivity, opposite to said first type of conductivity, and formed by introducing dopants inside said sensitive portion.

10. A pressure sensor according to claim 8, also comprising a piezoresistive reference element integrated within a second portion of said bulk region separate and distinct with respect to said sensitive portion, said reference element having a constant resistance as said pressure changes, and being connected with said first high-pressure detecting element and said further high-pressure detecting elements in said second bridge circuit.

11. A sensor according to claim 6, wherein said first high-pressure detecting element is separated from said membrane by a distance of not less than 50 μm.

12. A pressure sensor according to claim 1, wherein said membrane is arranged in a central position with respect to said sensitive portion, and said sensitive portion is arranged in a central position with respect to said monolithic body.

13. A pressure sensor according to claim 1, also comprising a cushion layer of elastic material, formed above said first main surface, and configured to distribute said pressure in a uniform manner on said sensitive portion.

14. A pressure measurement device, comprising:
   a measurement circuit; and
   a pressure sensor electrically connected to said measurement circuit, said pressure sensor including:
   a monolithic body of semiconductor material having a first main surface, a bulk region and a sensitive portion structured to be acted on by pressure;
   a cavity, formed in said monolithic body and separated from said first main surface by a membrane, which is flexible and deformable as a function of said pressure, said membrane being arranged inside said sensitive portion and surrounded by said bulk region; and
   a piezoelectric first low-pressure detecting element sensitive to first values of said pressure, integrated in said membrane and having a variable resistance as a function of the deformation of said membrane; and
   a high pressure sensitive element, arranged externally to said membrane and sensitive to second values of said pressure, higher than said first values.

15. A device according to claim 14, wherein said measurement circuit is integrated inside said monolithic body.

16. A device according to claim 14, wherein said high pressure sensitive element comprises a piezoresistive first high-pressure detecting element formed in said bulk region inside said sensitive portion and having a variable resistance as a function of said pressure.

17. A device according to claim 16, wherein said bulk region exhibits a first type of conductivity, and wherein said first low-pressure detecting element and said first high-pressure detecting element comprise a respective doped region having a second type of conductivity, opposite to said first type of conductivity, and formed by introduction of dopants within said monolithic body.

18. A device according to claim 16, wherein the pressure sensor includes further piezoresistive low-pressure detecting elements integrated within said membrane, and wherein said high pressure sensitive element also comprises further piezoresistive high-pressure detecting elements integrated within said bulk region and inside said sensitive portion, said first low-pressure detecting element and said further low-pressure detecting elements being connected in a first bridge circuit, and said first high-pressure detecting element and said further high-pressure detecting elements being connected in a second bridge circuit, distinct from said first bridge circuit.

19. A device according to claim 18, wherein said bulk region exhibits a first type of conductivity, and wherein said first low-pressure detecting element and said further low-pressure detecting elements, and said first high-pressure detecting element and said further high-pressure detecting elements are connected to each other by respective interconnections, said interconnections including doped regions having a second type of conductivity, opposite to said first type of conductivity, and formed by introducing dopants inside said sensitive portion.

20. A device according to claim 18, wherein the pressure sensor includes a piezoresistive reference element integrated within a second portion of said bulk region separate and distinct with respect to said sensitive portion, said reference element having a constant resistance as said pressure changes, and being connected with said first high-pressure detecting element and said further high-pressure detecting elements in said second bridge circuit.

21. A device according to claim 20, wherein said measurement circuit, under certain operating conditions, is structured to perform a pressure measurement as a function of a difference between resistances of said first high-pressure detecting element and said first reference element.

22. A device according to claim 14, wherein the pressure sensor includes a cushion layer of elastic material, formed above said first main surface, and configured to distribute said pressure in a uniform manner on said sensitive portion.

23. A braking system comprising:
a brake; and
a pressure measurement device coupled to the brake and including:
a measurement circuit; and
a pressure sensor electrically connected to said measurement circuit, said pressure sensor including:
a monolithic body of semiconductor material having a first main surface, a bulk region and a sensitive portion structured to be acted on by pressure;
a cavity, formed in said monolithic body and separated from said first main surface by a membrane, which is flexible and deformable as a function of said pressure, said membrane being arranged inside said sensitive portion and surrounded by said bulk region; and
a piezoelectric first low-pressure detecting element sensitive to first values of said pressure, integrated in said membrane and having a variable resistance as a function of the deformation of said membrane; and
a high pressure sensitive element, arranged externally to said membrane and sensitive to second values of said pressure, higher than said first values.

24. A system according to claim 23, wherein the brake includes a brake disc, an electronic control unit and an electromechanical actuator configured to exert a braking action on said brake disc in response to control signals generated by said electronic control unit, wherein said pressure measurement device is configured to take a measurement of pressure exerted by said electromechanical actuator on said brake disc, and is structured to provide said electronic control unit with said measurement in feedback.

25. A system according to claim 23, wherein said measurement circuit is integrated inside said monolithic body.

26. A system according to claim 23, wherein said high pressure sensitive element comprises a piezoresistive first high-pressure detecting element formed in said bulk region inside said sensitive portion and having a variable resistance as a function of said pressure.

27. A system according to claim 26, wherein said bulk region exhibits a first type of conductivity, and wherein said first low-pressure detecting element and said first high-pressure detecting element comprise a respective doped region having a second type of conductivity, opposite to said first type of conductivity, and formed by introduction of dopants within said monolithic body.

28. A system according to claim 26, wherein the pressure sensor includes further piezoresistive low-pressure detecting elements integrated within said membrane, and wherein said high pressure sensitive element also comprises further piezoresistive high-pressure detecting elements integrated within said bulk region and inside said sensitive portion, said first low-pressure detecting element and said further low-pressure detecting elements being connected in a first bridge circuit, and said first high-pressure detecting element and said further high-pressure detecting elements being connected in a second bridge circuit, distinct from said first bridge circuit.

29. A system according to claim 28, wherein said bulk region exhibits a first type of conductivity, and wherein said first low-pressure detecting element and said further low-pressure detecting elements, and said first high-pressure detecting element and said further high-pressure detecting elements are connected to each other by respective interconnections, said interconnections including doped regions having a second type of conductivity, opposite to said first type of conductivity, and formed by introducing dopants inside said sensitive portion.

30. A system according to claim 28, wherein the pressure sensor includes a piezoresistive reference element integrated within a second portion of said bulk region separate and distinct with respect to said sensitive portion, said reference element having a constant resistance as said pressure changes, and being connected with said first high-pressure detecting element and said further high-pressure detecting elements in said second bridge circuit.

31. A system according to claim 30, wherein said measurement circuit, under certain operating conditions, is structured to perform a pressure measurement as a function of a difference between resistances of said first high-pressure detecting element and said first reference element.

32. A device according to claim 23, wherein said pressure sensor includes a cushion layer of elastic material, formed above said first main surface, and configured to distribute said pressure in a uniform manner on said sensitive portion.

* * * * *

UNITED STATES PATENT AND TRADEMARK OFFICE
CERTIFICATE OF CORRECTION

PATENT NO.         : 7,578,196 B2                                    Page 1 of 1
APPLICATION NO.   : 12/018068
DATED               : August 25, 2009
INVENTOR(S)        : Giulio Ricotti et al.

It is certified that error appears in the above-identified patent and that said Letters Patent is hereby corrected as shown below:

Title Page Item 12 and Item 75
"Giulio Riccoti" should read as --Giulio Ricotti--.

Signed and Sealed this

Twelfth Day of October, 2010

David J. Kappos
*Director of the United States Patent and Trademark Office*